US010257206B2

(12) United States Patent
He et al.

(10) Patent No.: US 10,257,206 B2
(45) Date of Patent: Apr. 9, 2019

(54) MONITORING ACTIONS PERFORMED BY A NETWORK OF PEER DEVICES USING A BLOCKCHAIN (71) Applicant: International Business Machines Corporation, Armonk, NY (US)

(72) Inventors: Miao He, Beijing (CN); Changrui Ren, Beijing (CN); Bing Shao, Beijing (CN); Yue Tong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 15/386,997

(22) Filed: Dec. 21, 2016

(65) Prior Publication Data
US 2018/0176228 A1 Jun. 21, 2018

(51) Int. Cl.
H04L 29/06 (2006.01)
H04L 29/08 (2006.01)
H04W 12/08 (2009.01)
H04W 12/04 (2009.01)
H04W 12/06 (2009.01)
H04L 9/32 (2006.01)

(52) U.S. Cl.
CPC .......... H04L 63/105 (2013.01); H04L 9/3236 (2013.01); H04L 63/1416 (2013.01); H04L 67/104 (2013.01); H04L 67/12 (2013.01); H04W 12/04 (2013.01); H04W 12/06 (2013.01); H04W 12/08 (2013.01); H04L 2209/38 (2013.01)

(58) Field of Classification Search
CPC ....... H04L 63/105; H04L 63/10; H04L 63/14; H04L 63/1414; H04L 63/08; H04L 63/102; H04L 67/104; H04L 67/102; H04L 67/10; H04W 12/04; H04W 12/06; H04W 12/08
See application file for complete search history.

(56) References Cited

U.S. PATENT DOCUMENTS

| 6,061,449 | A | 5/2000 | Candelore et al. |
| 2015/0106061 | A1* | 4/2015 | Yang ...................... G08C 17/00 702/188 |
| 2015/0244690 | A1 | 8/2015 | Mossbarger |
| 2016/0071108 | A1 | 3/2016 | Caldera et al. |
| 2016/0148488 | A1 | 5/2016 | Tijerina et al. |
| 2017/0031676 | A1* | 2/2017 | Cecchetti .................. G06F 8/65 |
| 2017/0126704 | A1* | 5/2017 | Nandha Premnath ...................... H04L 63/145 |

(Continued)

OTHER PUBLICATIONS

Anonymously, Device Authentication by Continuous or Repeated Ambient Biometric Data Collection, Jun. 24, 2016.

(Continued)

Primary Examiner — Hadi S Armouche
Assistant Examiner — Shaqueal D Wade (57) ABSTRACT A blockchain of transactions may be referenced for various purposes and may be later accessed by interested parties. One example may comprise one or more of creating one or more control commands configured to control one or more smart devices, signing the one or more control commands via a key maintained by an entity creating the control commands, broadcasting the one or more control commands to the one or more smart devices, and storing the one or more control commands in a blockchain.

20 Claims, 10 Drawing Sheets (56) References Cited

U.S. PATENT DOCUMENTS

2018/0026963 A1* 1/2018 Ning .................. H04L 63/0428
2018/0176224 A1* 6/2018 Cho ........................ H04L 63/10

OTHER PUBLICATIONS

Anonymously, Retail Security Systems' Monitoring using Mobile Technology, Dec. 20, 2012.
Anonymously, Using a smartphone for out-of-band risk-based authentication and authorization of access into legacy applications, Aug. 19, 2013.

* cited by examiner

MONITORING ACTIONS PERFORMED BY A NETWORK OF PEER DEVICES USING A BLOCKCHAIN

TECHNICAL FIELD

This application relates to using a blockchain for a monitoring action, and more particularly, to monitoring actions performed by a network of peer devices using a blockchain.

BACKGROUND

A blockchain may be used as a public ledger to store any type of information. Although primarily used for financial transactions, the blockchain can store any type of information including assets (i.e., products, packages, services, etc.) in its immutable ledger. With the increased capabilities of home networks, on-site device security and various devices used to offer such services (e.g., smart devices, Internet of Things (IoT) devices, etc. security threats are becoming more and more severe especially when devices are connected to networks. Webcams, electronic locks and the like may be maliciously accessed and used for nefarious purposes.

SUMMARY

One example method of operation may include one or more of creating one or more control commands configured to control one or more smart devices, signing the one or more control commands via a key maintained by an entity creating the control commands, broadcasting the one or more control commands to the one or more smart devices, and storing the one or more control commands in a blockchain.

Another example embodiment may include an apparatus that includes a processor configured to perform one or more of create one or more control commands configured to control one or more smart devices, sign the one or more control commands via a key maintained by an entity creating the control commands, broadcast the one or more control commands to the one or more smart devices, and store the one or more control commands in a blockchain.

Yet another example embodiment may include a non-transitory computer eadable storage medium with instructions that cause a processor to perform one or more of creating one or more control commands configured to control one or more smart devices, signing the one or more control commands via a key maintained by an entity creating the control commands, broadcasting the one or more control commands to the one or more smart devices, and storing the one or more control commands in a blockchain.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the applications claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments include assigning privileges and actions in a blockchain to be performed by devices operating in a network environment (such as a peer network) to identify threats and security risks. Further embodiments include a blockchain based approach to providing access, storage, security and other features associated with receiving a logging controls commands and other related data and sharing such information with intended recipients. Once commands and authority/authorization/privileges are established and shared with the appropriate device, the devices can be monitored and any unexpected/illegal actions of the monitored devices can be discovered. Devices can be monitored in a peer network environment from one or more peer devices to monitor unauthorized control of malicious devices or hackers. Blockchains usually operate on a peer-to-peer (P2P) network in a practical use base. The P2P network contains multiple computers (nodes), and not all of them are trusted members. Once a block containing various transactions/messages/control commands is generated, it is generally broadcasted to all the network nodes affiliated with the blockchain in the network. A node that received the block will verify whether the block is correct (i.e., verifier, miner, etc.). Once the block passes the verification, the peer will relay the block to all the nodes connected to it, thus the block can be propagated in the network.

Figure 1:
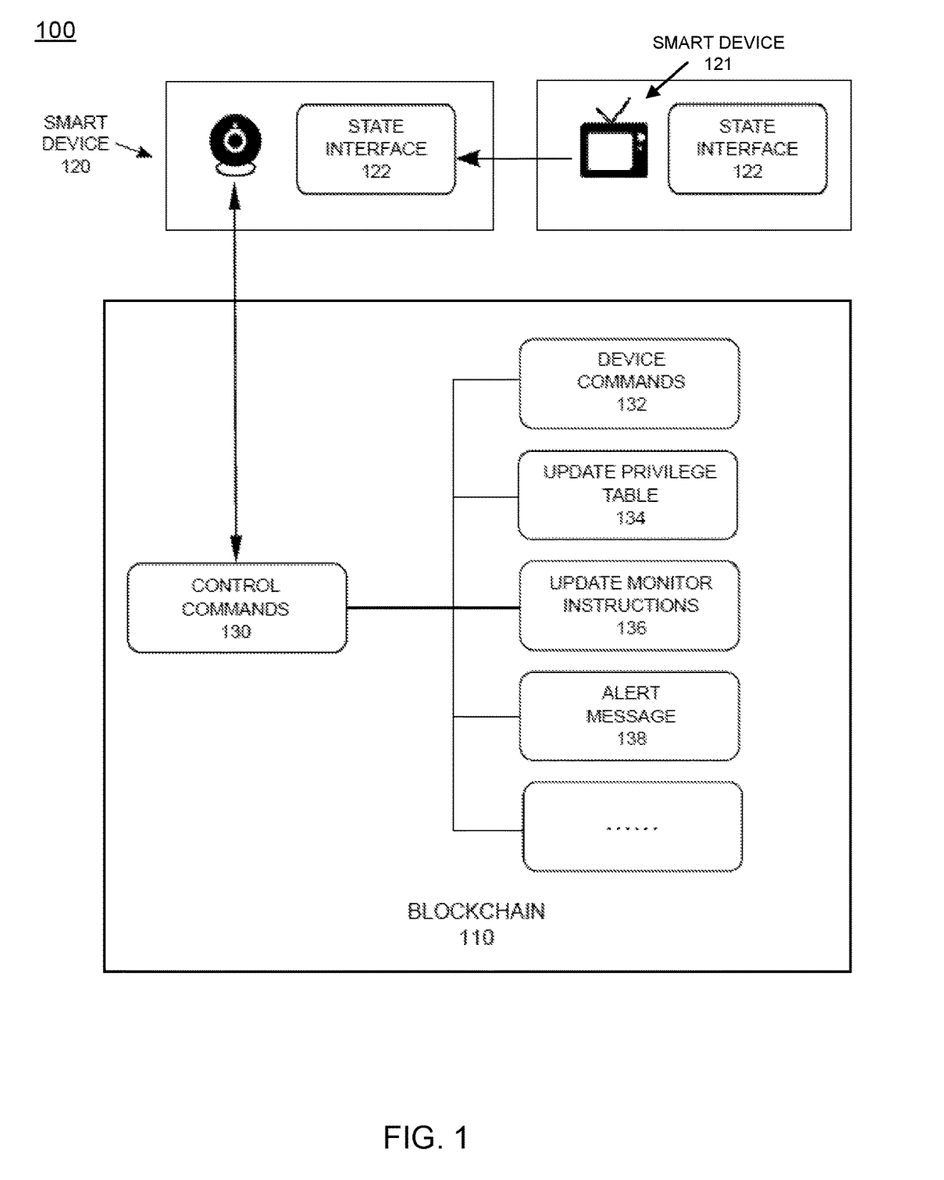
FIG. 1 illustrates a blockchain being used to provide access and controls to a smart device according to example embodiments.

FIG. 1 illustrates a blockchain 110 being used to provide access and controls 100 to one or more smart devices 120/121 according to example embodiments. Referring to FIG. 1, the control commands 130 may be submitted by one or more controlling/management entities, such as a user operating a smartphone who owns a home with a plurality of smart devices. Or, in another example, an office manager working on a computer, such as a laptop, who is responsible for security at a particular facility. The control commands have various types, including but not limited to (a) the device commands 132 that may include commands which the owner and/or authorized devices can control (other) devices; (b) update privilege table 134 that the owner and/or authorized devices can send to update privilege tables of the devices; (c) update monitor instructions 136 that the owner and/or authorized devices can send to define the logic how the devices are monitored; (d) alert message 138 that informs the owner and/or user about the discovered illegal actions; (e) and other related commands. These control commands will be signed, broadcasted, and stored using the blockchain and the P2P network.

According to the nature of data storage and management of the blockchain, the commands cannot be counterfeited, all the command histories are traceable, and all the devices have a shared ledger for commands. The state interface 122 represents an interface enacted by each device which opens a query interface for other devices' access. The query interface has several query functions for different purposes. Each device maintains an authorization table for each query function. The modification of an authorization table can be achieved by control commands. The control commands may include monitor instructions 136 for monitoring specific devices for specific purposes and to audit the use of specific commands, traffic flow, etc. For example, the monitor instructions can be set by the manager/administrator/owner to identify possible exceptions in an audited device among devices in the network. All the devices can monitor other devices in the network, following the guidance of the monitor instructions. Thresholds may be established, such as number of photographs, video content, bandwidth usage, etc., by each device, to identify whether violations are and even potential hacking has occurred.

Figure 2:
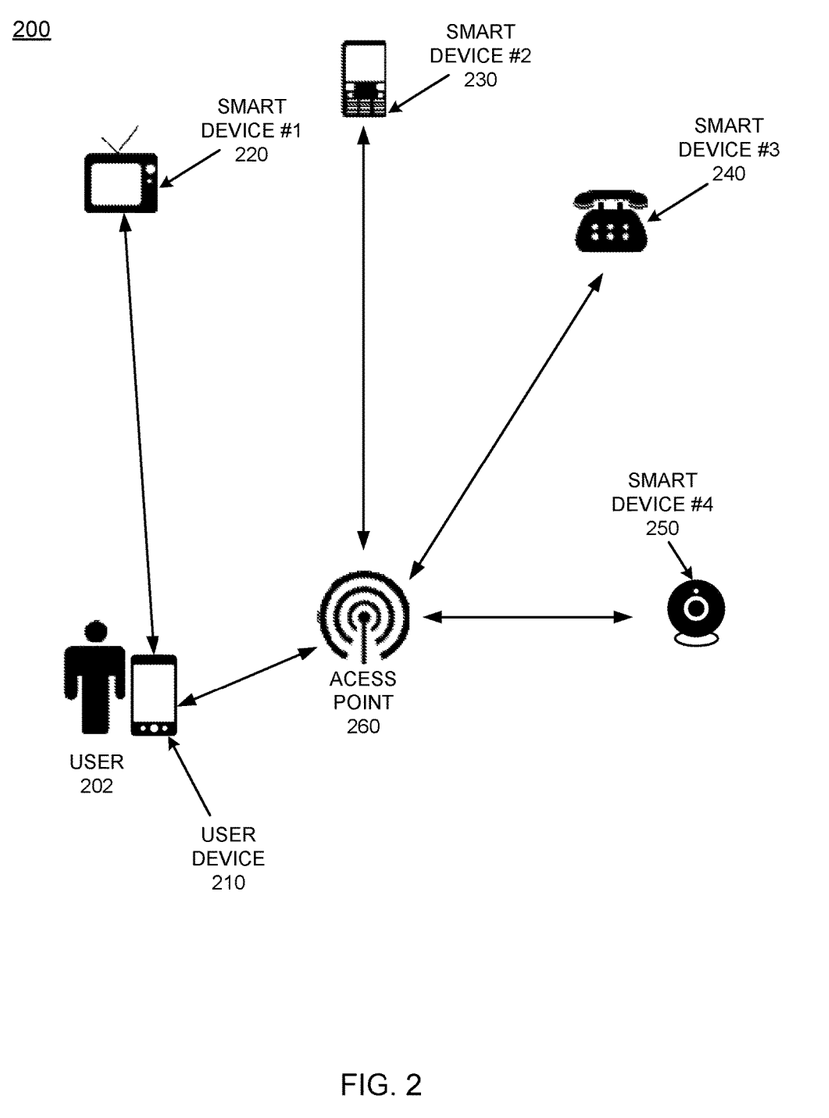
FIG. 2 illustrates an example system network of a user controlling multiple smart devices operating in a network according to example embodiments.

FIG. 2 illustrates an example system network of a user controlling multiple smart devices operating in a network according to example embodiments. Referring to FIG. 2, the network 200 includes a wireless access point, such as a home router 260 or other communication source, including but not limited to cellular data communication, short range wireless protocols such as WiFi and Bluetooth, etc. The smart devices 220, 230, 240 and/or 250 are designated "smart" because they can be recognized as nodes on a network. The user 202 may operate a user device 210, such as a tablet, computer or smartphone, 210 to submit commands, instructions, and other data to a blockchain for access by the one or more smart devices. Messages transmitted between devices are signed by asymmetric encryption. The owner has one key pair, and each device knows the owner's public key to verify the owner's commands. Each device can have one or more key pairs, (i.e., identities). One device can query other device by sending messages signed by its own private key. The responses may also be signed. Each device has a privilege table, the owner can modify the privilege table by signing control commands. The owner can set several monitor instructions on some devices. Devices can monitor other devices according to the monitor instructions.

In one example, the monitor instructions may include:
if blockchain.web_camera_state==closed
if router.get_network_traffic(cam)>10 KB/s
broadcast alert to blockchain.

In this example, the television 220 has the privilege to query other devices' network traffic. The keys assigned to the devices may include the television 220 (public_key6, private_key6), mobile phone 230 (public_key5, private_key5), home telephone (public_key3, private_key3), and (public_key4, private_key4), home camera (public_key2, private_key2), access point 260 (public_key1, private_key), and user device (public_key0, private_key0). The privilege table may include the following privileges: IS_POWER_ON public_key6, GET_CONNECTED_DEVICES public_key6, GET_CONNECTED_DEVICES public key5, GET_NETWORK_TRAFFIC public_key6.

Each device can query other device's status if it has the privilege. For example, if the TV has the "QUERY_REALTIME_NETWORK_TRAFFIC" privilege of the access point, it can send query messages to the access point and the access point will return the real time network traffic of each device. The term "QUERY_REALTIME_NETWORK_TRAFFIC" represents the state interface of the access point. The privilege table is a table that stores whether device A has privilege X of device B. Electronic signatures that could be verified by public keys are used to verify the device's identity, so devices' identities are often represented by the devices' public keys. The privilege table must be defined and modified by "update privilege table" control commands. All these commands will be placed into the blockchain such that all the devices have the consensus about the privilege table. In the webcam example, since control commands are stored in the blockchain, the TV can retrieve the blockchain to obtain the status of the webcam. If the TV receives a notification that "the webcam is not working" from the blockchain and the TV obtains a notification that "the webcam has large network traffic" from "QUERY_REAL-_TIME_NETWORK_TRAFFIC" state interface of the access point, it can be inferred that the webcam may be controlled by hackers.

One example method of operation may include a method or apparatus to monitor illegal actions of devices using the blockchain. By forwarding control commands to the blockchain, such that blockchain can be applied to a IoT security scenario. The devices can access the blockchain and identify the instructions provided to each of them. Inter-device monitoring can then be performed in an IoT security scenario, such that device manufacturer's open access loopholes and the corresponding hackers can be discovered promptly. This example, implements control commands, such that all the devices have a consensus about the owner's control, which is not affected by a power-off, a network failure, etc.

Other examples may include monitoring actions of smart devices (e.g., P2P network) using blockchain for IoT security. Some devices may have an interface to notify/alarm the owner, storage to store the blockchain and/or computing power. The ledger owner and authorized devices can control other devices by sending control commands, which are signed by the party excelling the control. The control commands are broadcasted using a P2P network, and stored in the blockchain data blocks which can be stored and propagated through h blockchain such that the offline devices are synchronized to the latest states when they rejoin the network. Each device opens a query interface for other devices' access, and each device maintains a privilege table for each query function, which prevents unauthorized access of a query interface revision of the authorization table. This is done by control commands sent by the owner which include monitor instructions to specify the variables to be monitored by each device. All the devices can monitor other devices in the network by following the monitoring instructions. The authorized devices can create an alert based on the owner specified rules. In another example, the user can program various monitor instructions (i.e., a piece of script that instructs how one or more devices monitor other devices' actions). In this example, the monitor instruction tells the TV how to discover a webcam's illegal actions. Since the network contains different kinds of devices, various monitor instructions can be set up to enable devices to monitor each other's actions. Since the network contains different kinds of devices, and the application scenarios tend to vary. The user must program its own monitor instructions to determine how the devices are monitored. The list of variables and the threshold result should be defined in the monitor instructions as well.

Figure 3:
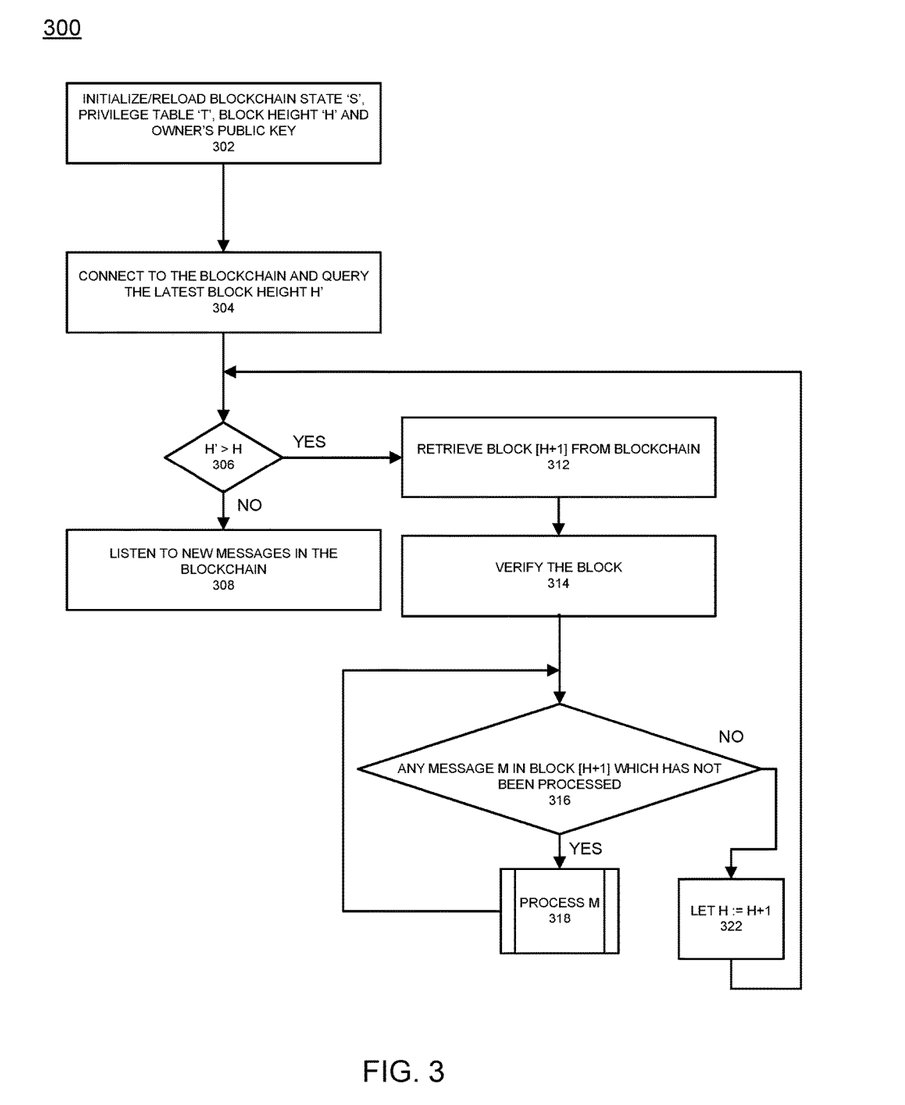
FIG. 3 illustrates an example logic flow diagram of a smart device access and power-on operation in a network according to example embodiments.

FIG. 3 illustrates an example logic flow diagram of a smart device access and power-on operation in a network according to example embodiments. Referring to FIG. 3 the flow diagram 300 describes a situation when one or more of the smart devices is powered-on and the device may initialize/reload a blockchain state 'S' a privilege table 'T' a block eight 'H' and an owner's public key 302. The device may then attempt to connect to a machine that has the blockchain data and query the latest block height H' 304. The latest height H' is compared to the block height H 306 and if the latest height H' is not greater than the block height, then the device listens for new messages that arrive in the blockchain 308. If H' is greater/larger/more than H then a block is retrieved [H+1] from the blockchain 312 and the block is verified 314. Any message in block [H+1] which has not been processed is then identified if it exits 316. The process 'M' 318 is then performed if available to be processed, otherwise H is set to H+1 at 322 and the process repeats. FIG. 3 describes how a blockchain is synchronized when a device is off-line for some time and becomes on-line again. For example, if the TV is off-line for some time, it may miss control commands during that time period. So when the TV is on-line again, it needs to query the blocks during that time period and process the control commands in the blocks.

Figure 4:
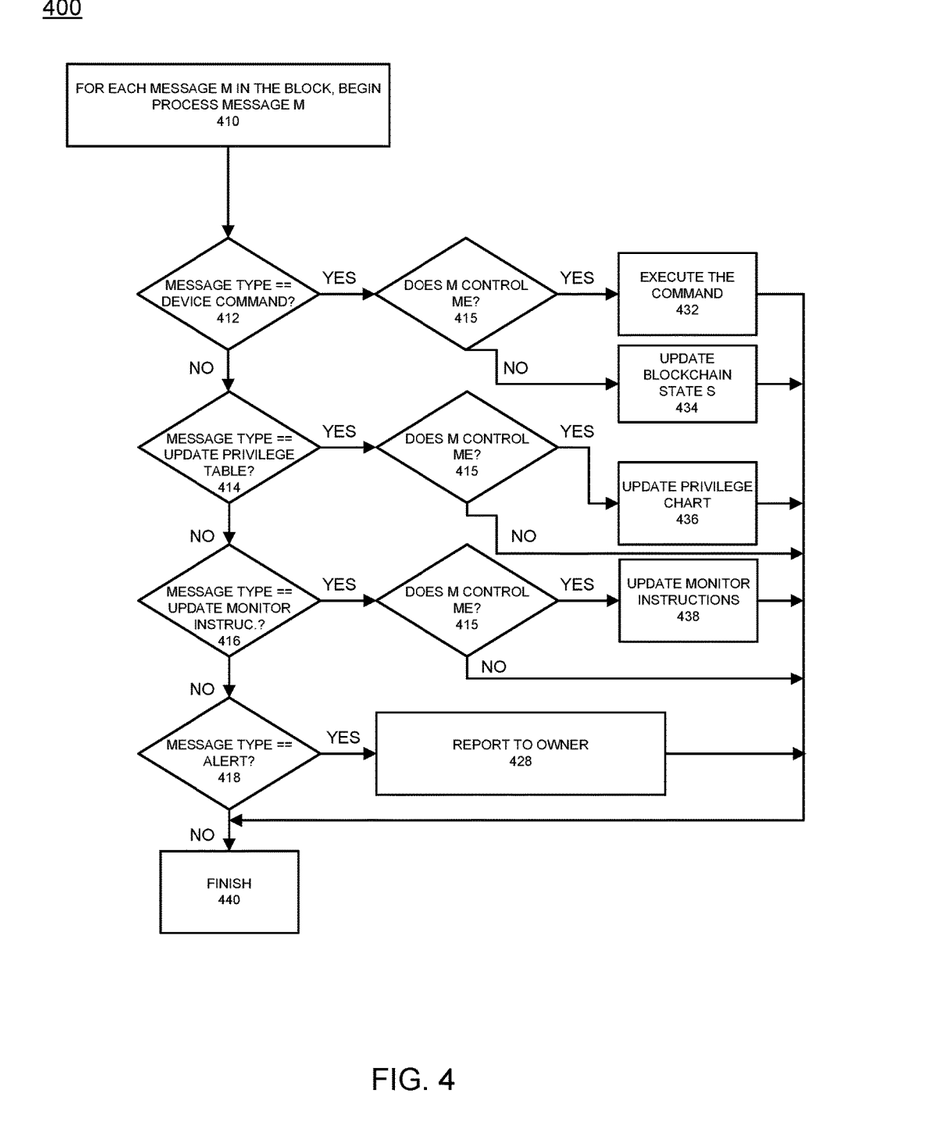
FIG. 4 illustrates an example logic flow diagram of a block being received and verified in a network according to example embodiments.

FIG. 4 illustrates an example logic flow diagram 400 of a block being received and verified in a network according to example embodiments. Referring to FIG. 4, one or more of the following steps may occur: when a block is received, after verifying the block, for each message M in the block, a process message M is initiated 410. Message type is identified to determine if it is a device command 412, if not then update privilege table 414, if not update monitor instruction 416, if not then alert 418 which would require a report to owner 428 due to the nature of the alerts followed by a finish of the routine 440. However, if any of those above-noted message types are identified, then a decision as to whether M controls is performed 415. If so, the control message will execute the command 432 or update the blockchain state 'S' 434 depending on whether the message is a controlling message. If the message is an update to the privilege chart 414 then the update may occur accordingly 436. Also, if the message is to update a monitor instruction 416 then the monitor instructions are updated 438. Any of the smart devices may perform this flow logic when messages are identified in the blockchain upon a log-in, power-up or other synchronization function between the devices and the blockchain data. The control commands could be among various different types. When the TV receives a control command, it needs to identify what type of command is received, and then decide how to process that command, for example, some scenarios include (a) device commands controlling the TV, like "change the channel of the TV", it will execute the command, (b) device commands controlling the telephone, like "make a phone call", the TV will mark the telephone's status as "calling", (c) update monitor instructions/privilege table of the TV, the TV will update the monitor instructions/privilege table as it is described, (d) alert message, which indicates something exceptional happened, for example, the webcam is controlled by a hacker. The TV will display some words to warn/inform the owner.

Figure 5:
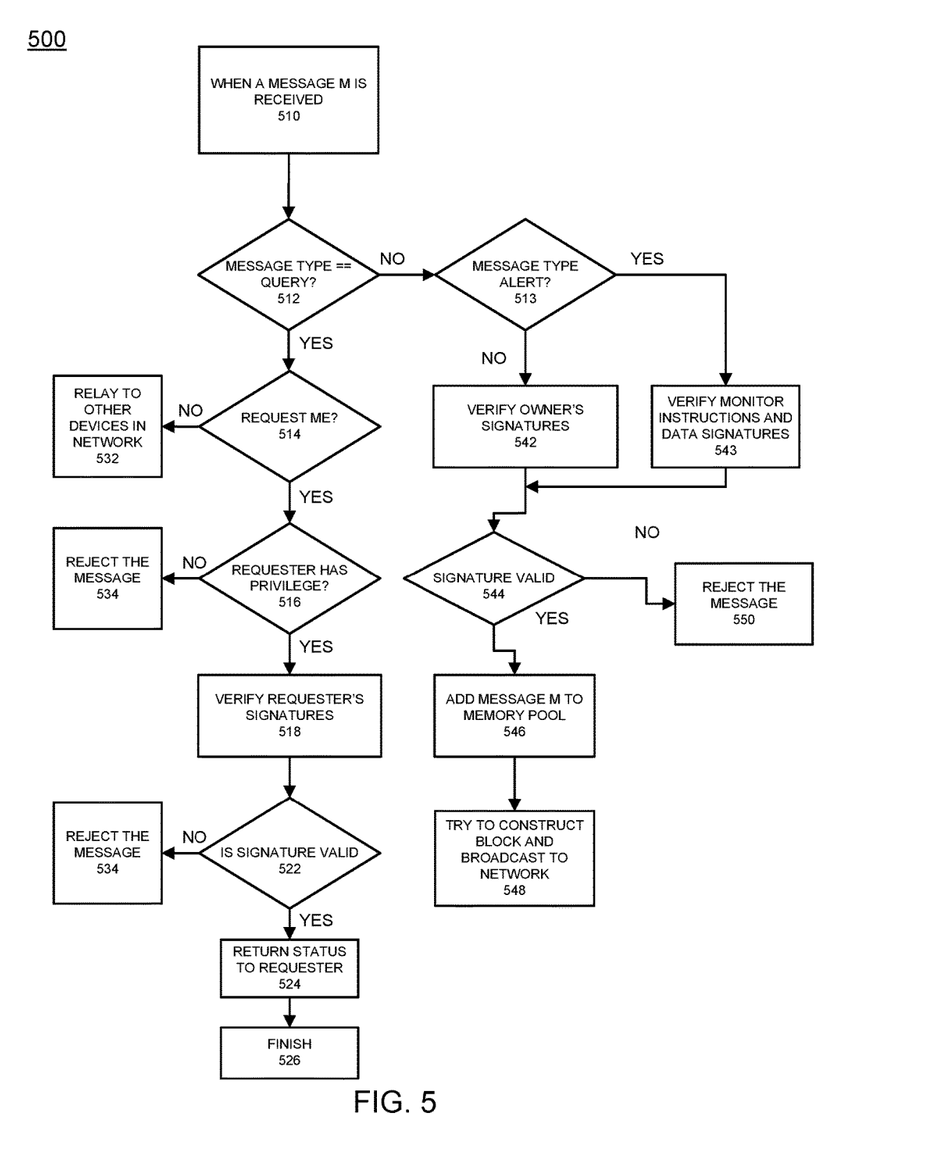
FIG. 5 illustrates an example logic flow diagram of miner and query message operation in a network according to example embodiments.

FIG. 5 illustrates an example logic flow diagram of miner and query message operation in a network according to example embodiments. Referring to FIG. 5, the diagram 500 includes a process of a miner and query message procedure that comprises one or more of the following steps. The message 'M' is received 510 and identified as a type query or not 512. If not, the message is identified as being a type alert 513 or not. If so, the instructions are verified along with the data signatures 543. If so, the owner's signature is verified 542 and the signature is validated 544. If not valid, the message is rejected 550. If the signature is valid the message 'M' is added to the memory pool 546. A block can then be constructed and broadcasted to the network 548. If the message is a type query 512, then the request is identified as belonging to the device or not 514. If not, the message is forwarded to other devices 532. If the request is for the device, then a privilege test is performed 516. The requester's signatures are verified 518 and if the signature is valid 522 the status is returned to the requester 524 and the process finishes 526. If not a valid signature, the message is rejected 534.

FIG. 5 describes how blocks are generated. The blocks are generated by a miner/computer in the network. When the miner receives messages broadcasted in the network, it will first determine the type of the message and process it according to its type, for example, a few scenarios include (a) query message: return if the miner itself is queried, otherwise relay the message to other devices in the network, (b) alert message: verify the signatures and monitor instructions, if the webcam is really conducting the illegal actions, i.e., the TV is not sending a false alert, put the message into the memory pool for the next block, (c) other messages: verify the signatures, if valid, put the message into the memory pool for the next block.

Figure 6:
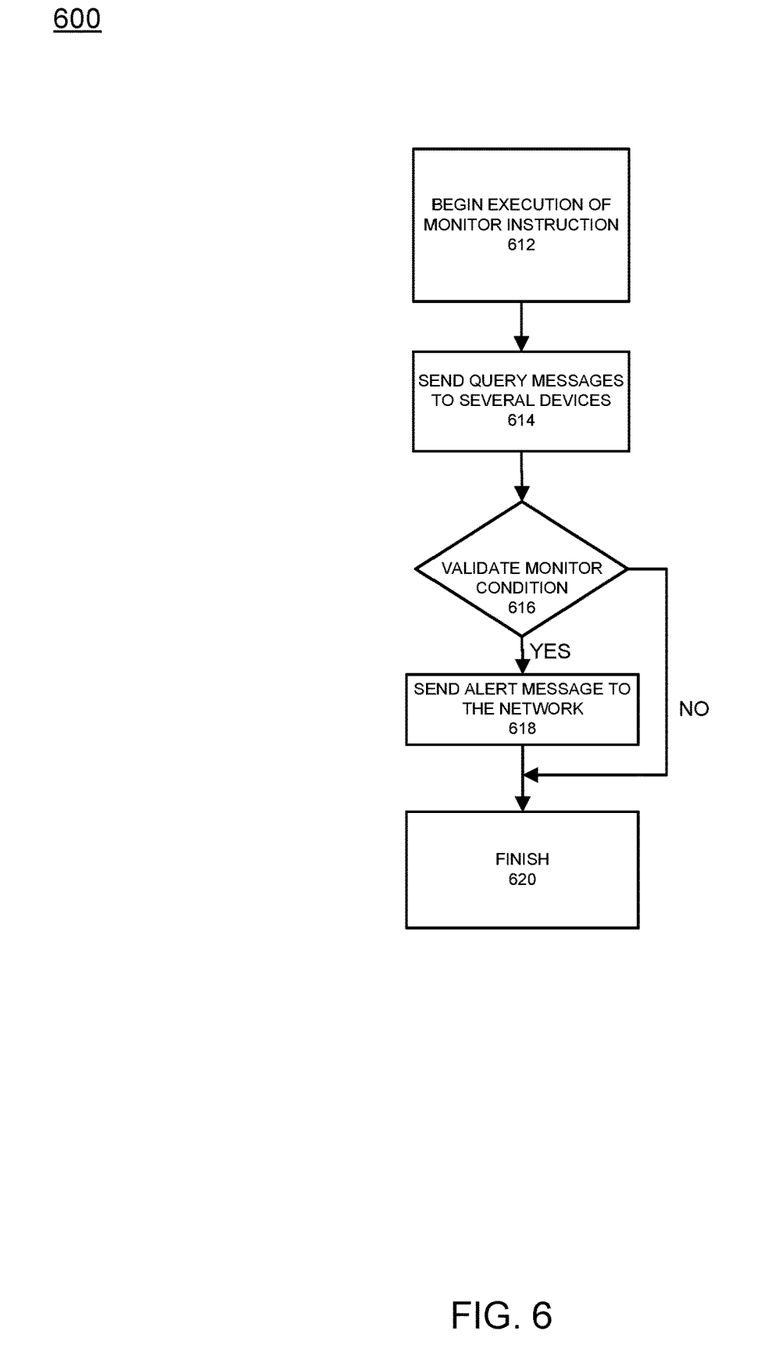
FIG. 6 illustrates an example logic flow diagram of a smart device executing monitor instructions in a network according to example embodiments.

FIG. 6 illustrates an example logic flow diagram of a smart device executing monitor instructions in a network according to example embodiments. Referring to FIG. 6, the process 600 depicts executing monitor instructions and comprises one or more of the following steps. The monitor instructions 612 are executed and a query is sent to the various devices being monitored/audited 614. The one or more monitor conditions are validated 616 and if they are valid, an alert message is sent to the owner/user 618. Otherwise, the process ends 620. The TV will follow the monitor instructions to monitor the webcam's status from time to time. The TV will look up the blockchain and send query messages to obtain the status of the webcam. If the condition is true, which means the webcam is conducting illegal actions, it will send an alert message in the network to inform the owner.

Figure 7:
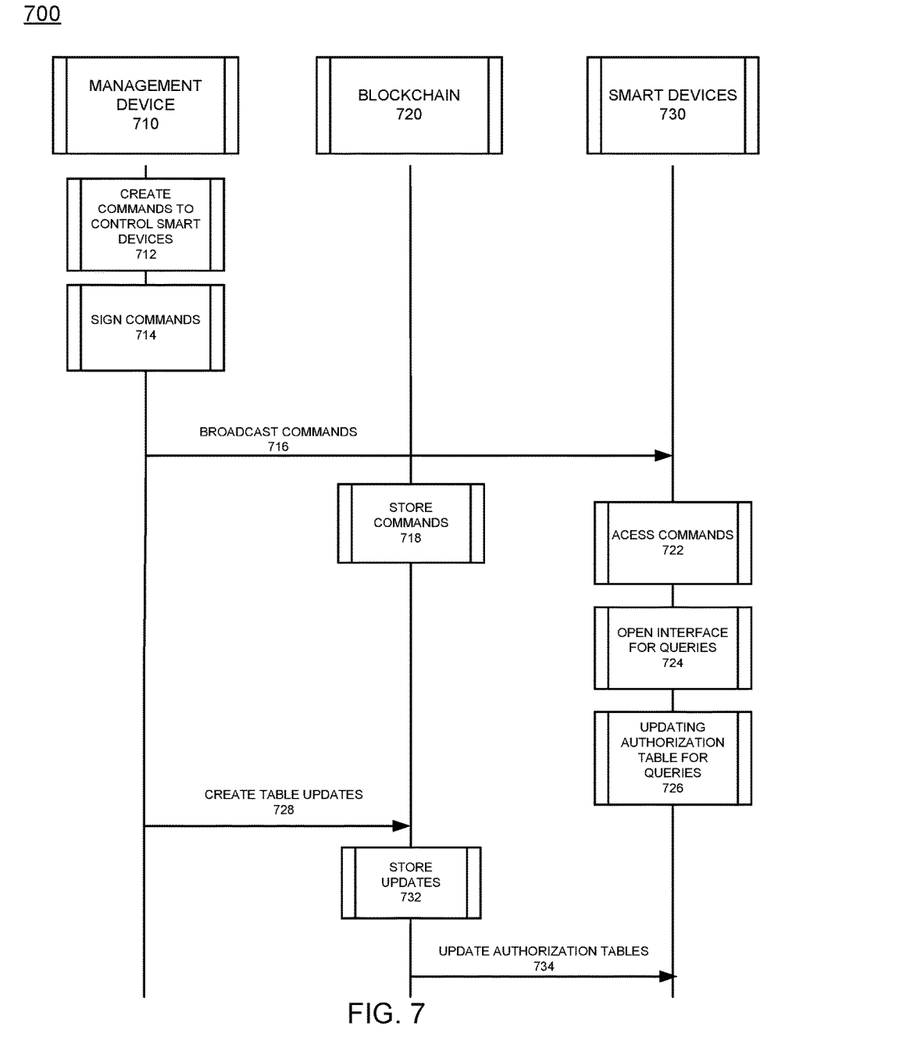
FIG. 7 illustrates a system signaling diagram of the interactions between a blockchain, a control manager and one or more smart devices according to example embodiments.

FIG. 7 illustrates a system signaling diagram of the interactions between a blockchain, a control manager and one or more smart devices according to example embodiments. Referring to FIG. 7, the system 700 includes a management device 710, a blockchain 720 and one or more smart devices 730 operating on a network and comprises one or more of the following steps. The management device 710 may create one or more commands to be sent to one or more smart devices 712. The commands may include monitor requirements, rules for monitoring, query commands, threshold data, etc. The commands are signed 714 and broadcasted 716 to the network devices 730. The commands are stored in the blockchain 718. The smart devices 730 can then access the commands 722, open interfaces for performing queries 724 and update authorization tables to provide privileges for devices to perform queries 726. Additional commands may be sent to create table updates 728. The updates may be stored 732 in the blockchain 720 and the devices 730 may update their tables 734 based on the updated commands.

Figure 8A:
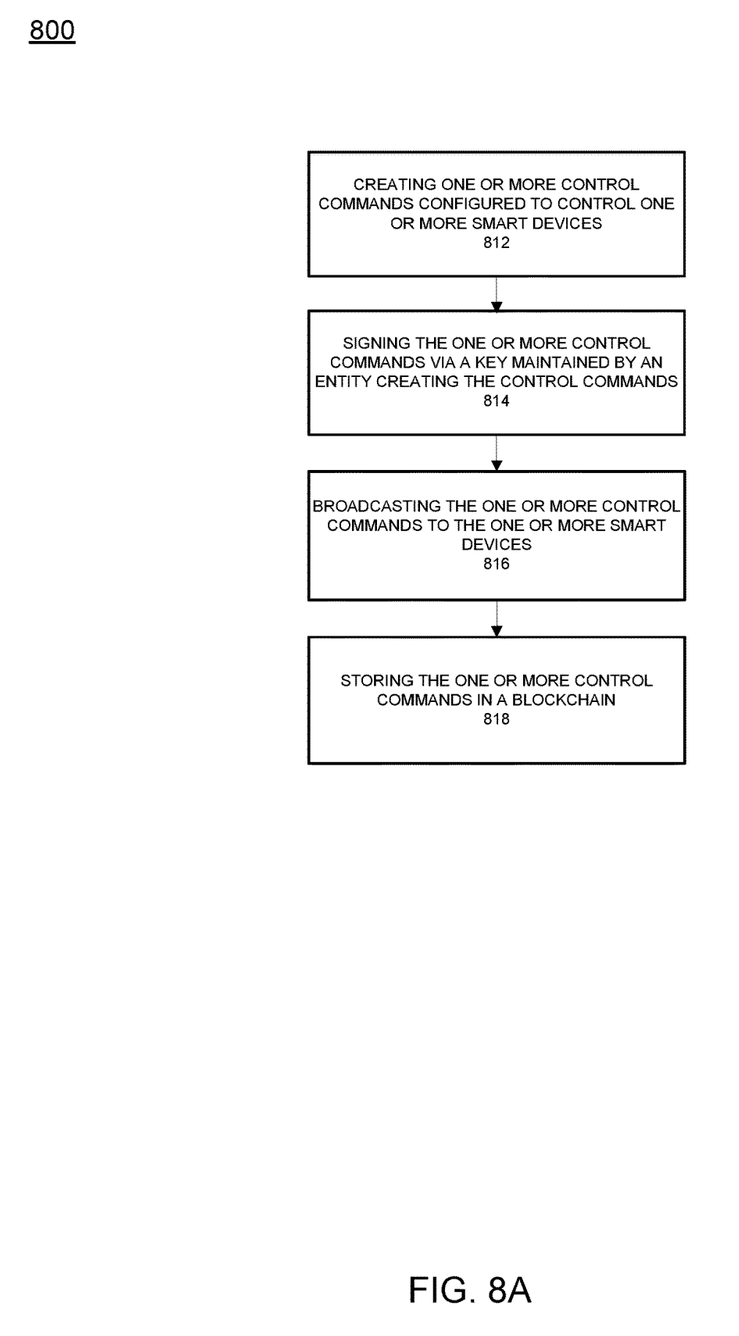
FIG. 8A illustrates a flow diagram of an example method of authorizing and updating assets in the blockchain according to example embodiments.

FIG. 8A illustrates a flow diagram of an example method of authorizing and updating assets in the blockchain according to example embodiments. The method 800 comprises one or more of creating one or more control commands configured to control one or more smart devices 812, signing the one or more control commands via a key maintained by an entity creating the control commands 814, broadcasting the one or more control commands to the one or more smart devices 816 and storing the one or more control commands in a blockchain 818. The method may also include creating one or more updates for the one or more smart devices, storing the one or more updates in the blockchain, and updating the one or more smart devices when the one or more smart devices connect to the blockchain. The one or more smart devices may store an authorization table for each query function. The management device may include creating one or more additional control commands including updates to the authorization tables, broadcasting the additional control commands and storing the additional control commands in the blockchain, and updating the authorization table to include the updates. The one or more control commands include one or more monitor instructions to be performed by the one or more smart devices. The method may also include initiating the one or more monitoring instructions, transmitting query messages to the one or more smart devices, receiving monitor condition feedback data from the one or more smart devices indicating that a monitoring threshold condition has been reached or exceeded, and responsive to receiving the monitor condition feedback, creating an alert notification to notify one or more interested parties. The method may also include transmitting the alert notification to the one or more interested parties, wherein the alert notification comprises the one or more monitor instructions and query results based on the transmitted query message.

Figure 8B:
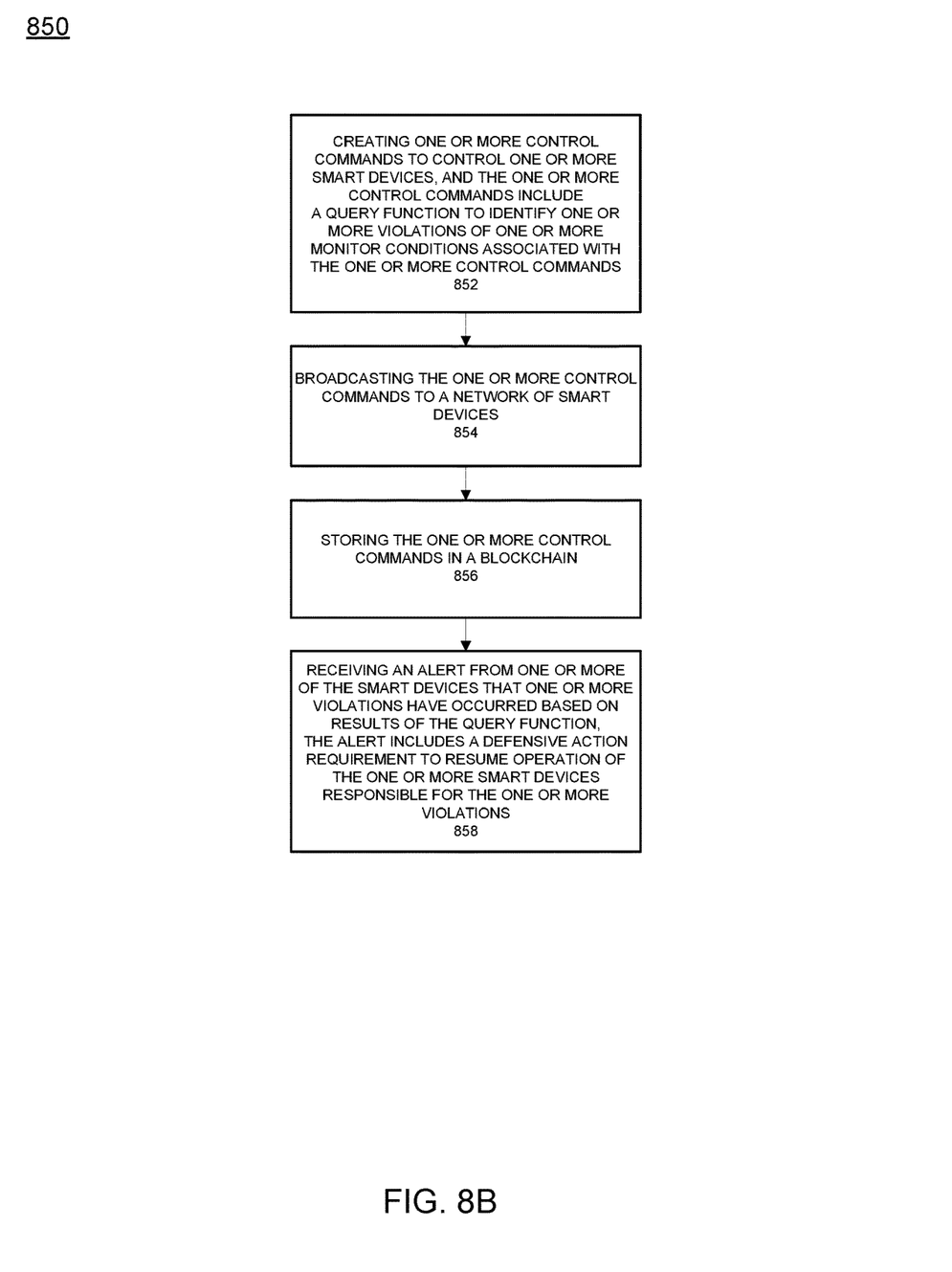
FIG. 8B illustrates a flow diagram of another example method of authorizing and updating assets in the blockchain according to example embodiments.

FIG. 8B illustrates a flow diagram of another example method of authorizing and updating assets in the blockchain according to other example embodiments. In this example method 850, the process comprises one or more of creating one or more control commands to control one or more smart devices, wherein the one or more control commands include a query function to identify one or more violations of one or more monitor conditions associated with the one or more control commands 852, broadcasting the one or more control commands to a network of peer devices 854, and storing the one or more control commands in a blockchain 856. The method may also include receiving an alert from one or more of the smart devices that one or more violations have occurred based on results of the query function, where the alert includes a defensive action requirement to resume operation of the one or more smart devices responsible for the one or more violations 858.

In this example, the smart device(s) responsible for the query and reporting the violation(s), such as camera snapshots or video of one other smart device being conducted in a manner that triggers an alert or an unauthorized use, excessive use, or any other suspicious use that triggers the alert based on the predetermined monitor conditions being violated. For example, the television may be a monitoring device which monitors network traffic of all smart devices in a household. The security camera inside the house may be operating in an unexpected manner based on the traffic monitoring actions detected with respect to the query function authorizing the television, in this example, to perform such query/audit operations. The alert may include a defensive action measure, such as a requirement overriding authorization from an interested party. For example, the user of a mobile device may be required to submit a password, a thumbprint or other biometric input, etc., prior to the violating device, in this case, the camera, to resume operation. A round robin leader assignment approach may be taken to ensure device integrity among all devices. For example, an initial setting may designate the television as the leader enacted to submit query functions to the other smart devices in the facility. The next day, the privilege/authorization table may receive new control commands which dictate that the leader has changed and the television is no longer the device responsible for submitting queries to the other smart devices. Also, the privilege table may authorize multiple devices to audit the other devices so no one device has all the outstanding assigned privileges.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 9 illustrates an example network element 900, which may represent or be integrated in any of the above-described components, etc.

Figure 9:
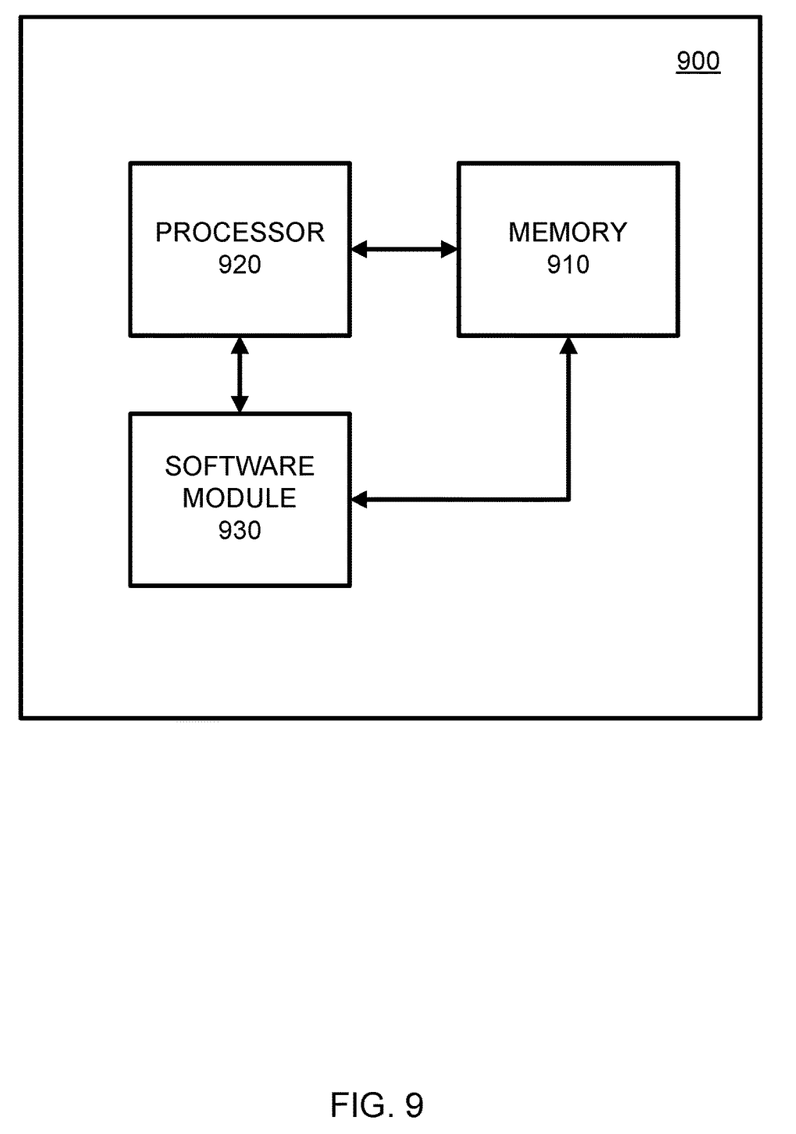
FIG. 9 illustrates an example network entity configured to support one or more of the example embodiments.

As illustrated in FIG. 9, a memory 910 and a processor 920 may be discrete components of a network entity 900 that are used to execute an application or set of operations as described herein. The application may be coded in software in a computer language understood by the processor 920, and stored in a computer readable medium, such as, a memory 910. The computer readable medium may be a non-transitory computer readable medium that includes tangible hardware components, such as memory, that can store software. Furthermore, a software module 930 may be another discrete entity that is part of the network entity 900, and which contains software instructions that may be executed by the processor 920 to effectuate one or more of the functions described herein. In addition to the above noted components of the network entity 900, the network entity 900 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   receiving, via at least one smart device, of a plurality of smart devices, one or more control commands broadcast from a management device and signed by a key maintained by the management device, the one or more control commands being configured to control the at least one smart device, wherein each smart device, of the plurality of smart devices includes a query interface to allow access by another smart device of the plurality of smart devices, and wherein each query interface includes a plurality of query functions each of which corresponds to a privilege table stored on a corresponding smart device;
   storing the one or more control commands in a blockchain associated with the plurality of smart devices to create a privilege table stored in the blockchain so that all smart devices have a consensus about the privilege table;

accessing, via the at least one smart device, of the plurality of smart devices, a broadcast command stored in the blockchain that is associated with the at least one smart device; and opening, via the at least one smart device, and based on the broadcast command stored in the blockchain, the query interface of at least one other smart device, of the plurality of smart devices, to monitor a security status of the at least one other smart device by the at least one smart device.

2. The method of claim 1, further comprising:
creating one or more updates for the plurality of smart devices;
storing the one or more updates in the blockchain; and
updating the plurality of smart devices when the plurality of smart devices connect to the blockchain.

3. The method of claim 1, wherein the plurality of smart devices stores an authorization table for each query function.

4. The method of claim 3, further comprising:
creating one or more additional control commands comprising updates to the authorization table;
broadcasting the one or more additional control commands;
storing the additional control commands in the blockchain; and
updating the authorization table to include the updates.

5. The method of claim 1, wherein the one or more control commands comprise one or more monitor instructions to be performed by the plurality of smart devices.

6. The method of claim 5, further comprising:
initiating the one or more monitor instructions;
transmitting query messages to the plurality of smart devices;
receiving monitor condition feedback data from the plurality of smart devices indicating that a monitoring threshold condition has been reached or exceeded; and
responsive to receiving the monitor condition feedback, creating an alert notification to notify one or more interested parties.

7. The method of claim 6, further comprising transmitting the alert notification to the one or more interested parties, wherein the alert notification comprises the one or more monitor instructions and query results based on the transmitted query message.

8. An apparatus, comprising:
a hardware-implemented processor configured to:
receive one or more control commands broadcast from a management device and signed by a key maintained by the management device, the one or more control commands being configured to control one or more smart devices, of a plurality of smart devices, wherein each smart device, of the plurality of smart devices includes a query interface to allow access by another smart device of the plurality of smart devices, and wherein each query interface includes a plurality of query functions each of which corresponds to a privilege table stored on a corresponding smart device;
store the one or more control commands in a blockchain associated with the one or more smart devices to create a privilege table stored in the blockchain so that plurality of smart devices have a consensus about the privilege table;
access a broadcast command stored in the blockchain that is associated with the one or more smart devices; and
open, based on the broadcast command stored in the blockchain, the query interface of at least one other smart device, of the plurality of smart devices, to monitor a security status of the at least one other smart device by the one or more smart devices.

9. The apparatus of claim 8, wherein the hardware-implemented processor is further configured to:
create one or more updates for the one or more smart devices;
store the one or more updates in the blockchain; and
update the one or more smart devices when the one or more smart devices connect to the blockchain.

10. The apparatus of claim 8, wherein the one or more smart devices stores an authorization table for each query function.

11. The apparatus of claim 10, wherein the hardware-implemented processor is further configured to:
create one or more additional control commands comprising updates to the authorization table;
broadcast the one or more additional control commands;
store the additional control commands in the blockchain; and
update the authorization table to include the updates.

12. The apparatus of claim 8, wherein the one or more control commands comprise one or more monitor instructions to be performed by the one or more smart devices.

13. The apparatus of claim 12, wherein the hardware-implemented processor is further configured to:
initiate the one or more monitor instructions;
wherein the apparatus further comprises: a transmitter configured to transmit query messages to the one or more smart devices;
a receiver configured to receive monitor condition feedback data from the one or more smart devices that indicates a monitor threshold condition has been reached or exceeded; and
responsive to the monitor condition feedback being received, the hardware-implemented processor is further configured to create an alert notification to notify one or more interested parties.

14. The apparatus of claim 13, wherein the transmitter is further configured to transmit the alert notification to the one or more interested parties, wherein the alert notification comprises the one or more monitor instructions and query results based on the transmitted query message.

15. A non-transitory computer readable storage medium configured to store at least one instruction that when executed by a processor causes the processor to perform:
receiving, via at least one smart device, of a plurality of smart devices, one or more control commands broadcast from a management device and signed by a key maintained by the management device, the one or more control commands being configured to control the at least one smart device, wherein each smart device, of the plurality of smart devices includes a query interface to allow access by another smart device of the plurality of smart devices, and wherein each query interface includes a plurality of query functions each of which corresponds to a privilege table stored on a corresponding smart device;
storing the one or more control commands in a blockchain associated with the plurality of smart devices to create a privilege table stored in the blockchain so that all smart devices have a consensus about the privilege table;

accessing, via the at least one smart device, of the plurality of smart devices, a broadcast command stored in the blockchain that is associated with the at least one smart device; and opening, via the at least one smart device, and based on the broadcast command stored in the blockchain, the query interface of at least one other smart device, of the plurality of smart devices, to monitor a security status of the at least one other smart device by the at least one smart device.

16. The non-transitory computer readable storage medium of claim 15, further configured to store at least one instruction that when executed by the processor causes the processor to perform:

creating one or more updates for the one or more smart devices;

storing the one or more updates in the blockchain; and updating the one or more smart devices when the plurality of smart devices connect to the blockchain.

17. The non-transitory computer readable storage medium of claim 15, wherein the plurality of smart devices stores an authorization table for each query function.

18. The non-transitory computer readable storage medium of claim 17, further configured to store at least one instruction that when executed by the processor causes the processor to perform:

creating one or more additional control commands comprising updates to the authorization table;

broadcasting the one or more additional control commands;

storing the additional control commands in the blockchain; and updating the authorization table to include the updates.

19. The non-transitory computer readable storage medium of claim 15, wherein the one or more control commands comprise one or more monitor instructions to be performed by the plurality of smart devices.

20. The non-transitory computer readable storage medium of claim 19, further configured to store at least one instruction that when executed by the processor causes the processor to perform:

initiating the one or more monitor instructions;

transmitting query messages to the plurality of smart devices;

receiving monitor condition feedback data from the plurality of smart devices indicating that a monitoring threshold condition has been reached or exceeded;

responsive to receiving the monitor condition feedback, creating an alert notification to notify one or more interested parties; and transmitting the alert notification to the one or more interested parties, wherein the alert notification comprises the one or more monitor instructions and query results based on the transmitted query message.

\* \* \* \* \*